Patented May 22, 1951

2,553,695

UNITED STATES PATENT OFFICE 2,553,695

MANUFACTURE OF CELLULOSE ETHERS

Merlyn Herbert Wilcox, John Downing, and James Gordon Napier Drewitt, Spondon, near Derby, England, assignors to Celanese Corporation of America, a corporation of Delaware No Drawing. Application September 28, 1948, Serial No. 51,655. In Great Britain October 17, 1947

14 Claims. (Cl. 260—231)

This invention relates to the manufacture of cellulose ethers.

Cellulose ethers are made by the action of an etherifying agent, e. g. an alkyl chloride or substituted alkyl chloride such as chloracetic acid, on cellulose in the presence of a caustic alkali, in commercial practice caustic soda. Usually the cellulose is first treated with the alkali whereby a so-called "alkali cellulose" is produced, and this alkali cellulose is then caused to react with the etherifying agent. For example cellulose may be impregnated with a fairly or highly concentrated solution of caustic soda and then pressed until it weighs about 2-3 times as much as before; it may then be allowed to age, or it may immediately be subjected to the action of an etherifying agent, which may be in either the liquid or the vapour phase. The composition and properties of the cellulose ether produced can be varied by varying the proportions of the several reactants, the degree to which the alkali cellulose is allowed to age, and the conditions of temperature and pressure under which the etherification is performed.

In accordance with the present invention, cellulose ethers are made by reaction between an alkali cellulose and an etherifying agent, in particular an alkyl halide or a substituted alkyl halide such as chloracetic acid, in the presence of a liquid ether-alcohol. (By the term "ether-alcohol" herein employed we mean an organic liquid containing one or more free hydroxyl groups and one or more ether groups.) We have found that the use of liquid ether-alcohols in this way makes it possible to obtain a product of a higher degree of etherification and of greater clarity than is attained under the same conditions but in the absence of the ether-alcohol.

Among the ether alcohols which may be used in accordance with the invention, the lower mono-alkyl ethers of glycols have been found to be particularly useful. Examples of these compounds are the mono-methyl, mono-ethyl, mono-propyl or iso-propyl, and mono-butyl ethers of ethylene glycol and of diethylene glycol and other polyethylene glycols. The mono- and di-lower alkyl ethers of glycerol are also useful, as are cyclic compounds such as quinitol mono-alkyl ethers.

The amount of the ether alcohol need not be great, and amounts down to 5% of the weight of the cellulose or even lower have a useful effect. It is, however, preferable to use about 8% or more, for example 10-30% of the weight of the cellulose. The ether-alcohol can be added to the cellulose either simultaneously with or after the etherifying agent, or at some earlier stage in the process, for example together with the alkali used to convert the cellulose into alkali cellulose or immediately before the addition of the etherifying agent.

The alkali cellulose may be made in the ordinary way by soaking the cellulose in a fairly or highly concentrated solution of the caustic alkali and then pressing the cellulose until it weighs about 2 to 3 times as much as before impregnation. The concentration of the caustic alkali solution should be above 12% and is preferably at least 18%, concentrations between 25% and 85% being particularly useful, depending to some degree on the nature of the cellulose ether desired. Thus, when making a water-soluble methyl cellulose or carboxy-methyl cellulose the concentration may with advantage be between 25% and 45%, and when making an ethyl cellulose soluble in organic solvents, solutions of concentrations above 40% give the best results. Indeed for some purposes the use of solutions of concentration above 70%, e. g. saturated solutions which may even contain some solid caustic alkali, has advantages in the production of, for example, ethyl cellulose. In general, the effect of the ether-alcohol in increasing the degree of etherification obtained under otherwise identical conditions appears to be greater the higher the concentration of the alkali solution; it is particularly marked when alkali solutions of concentration above 70% are employed.

The alkali cellulose, however it is made, may be introduced into an autoclave or other reaction vessel capable of withstanding the pressure required for the etherification and provided with a stirrer and means whereby the contents of the vessel may be heated or cooled at will. The ether-alcohol, if not already present with the alkali cellulose, may be introduced into the vessel at this stage. The vessel may then be evacuated, and the etherifying agent, e. g. methyl chloride or ethyl chloride, admitted. In the manufacture of ethyl cellulose it is preferable that the ethyl chloride should be pumped into the reaction vessel under a pressure such that it remains liquid at the highest temperature employed, but when making methyl cellulose very good results are obtained if the methyl chloride remains in the vapour phase throughout the etherification, for example under a pressure of about 50–80 lbs./sq. in. Etherifying agents which are liquid at the reaction temperature do not of course require the use of a pressure vessel; for example carboxy-methyl cellulose can be made by kneading a mixture of alkali cellulose, chloracetic acid and an ether-alcohol in a mixer operating under atmospheric pressure. Methylation and ethylation are preferably performed at a temperature between about 50° and 140° C., and especially between about 80° and 130° C.; carboxy methylation usually requires a lower temperature, e. g. about 40–100° C.

The time required for the etherification depends on various factors including the temperature and etherifying agent employed and the degree of etherification desired. For most purposes times between about 6 and 18 hours are suitable. The cellulose ether produced may be separated from the ether-alcohol, excess caustic alkali, and other substances in any suitable way; for example cellulose ethers such as ethyl cellulose which are soluble in organic solvents may be washed with hot or cold water, and water-soluble ethers such as methyl cellulose may be washed for example with hot water or with an alcohol.

The following examples illustrate the invention. All the parts mentioned are parts by weight.

Example 1

Purified wood pulp in sheet form was soaked in a 30% aqueous solution of caustic soda containing mono-methyl glycol, and then pressed until the cellulose contained about 2.4 moles of caustic soda for each glucose unit, and about 12% of its dry weight of the mono-methyl glycol. The impregnated cellulose was disintegrated and introduced into an autoclave from which the air was evacuated; methyl chloride was then pumped in, and the contents of the autoclave were heated to a temperature between 85° and 95° C., the pressure being maintained at about 70 lb./sq. in. by feeding in fresh methyl chloride as the reaction proceeded. After 7 hours the gases and vapours in the autoclave were blown off and the autoclave cooled. The methyl cellulose remaining was washed with the minimum quantity of hot water to remove inorganic impurities.

Example 2

Wood pulp in sheet form was immersed in 70% caustic soda and pressed to 2.5 times its original weight. The sheets were then broken up and the fragments introduced into an autoclave together with mono-methyl glycol in amount 20% of the original weight of the cellulose. The air was pumped out of the autoclave and ethyl chloride forced in under pressure in amount slightly less than the equivalent of the caustic soda, so that the mixture remained alkaline throughout the reaction. The mixture was stirred continuously and the autoclave heated to 130° C. for 12 hours, after which the gases and vapours were blown off and the ethyl cellulose remaining was thoroughly washed with cold or hot water.

Example 3

The procedure of Example 2 was followed, except that the cellulose was immersed in a 50% solution of caustic soda containing about 13% of mono-methyl glycol and then pressed to 2.7 times its original weight. The alkali cellulose thus contained about 22% of mono-methyl glycol, calculated on the original weight of the cellulose.

Example 4

Wood pulp was shredded and mixed with 7.4 times its weight of caustic soda in the form of an 80% aqueous solution and with 12% of its weight of mono-methyl glycol. The mixture was passed through a Werner-Pfleiderer mixer and was then transferred to an autoclave. The air in the autoclave was removed and ethyl chloride in amount 5 times the weight of the cellulose was pumped in. The autoclave was heated to 130° C. for 12 hours, after which the gases and vapours were blown off, the contents of the autoclave cooled, the alkali solution run off from the ethyl cellulose produced, and the latter then washed with water until free from alkali and salt.

Example 5

100 parts of a shredded wood pulp, 375 parts of caustic soda in the form of a 60% solution and 12 parts of mono-methyl glycol were introduced into an autoclave and stirred at room temperature for 24 hours. The air was then pumped out of the autoclave and 560 parts of ethyl chloride were pumped in and the contents of the autoclave heated to 130° C. for 11 hours. After this the gases and vapours were blown off, the contents of the autoclave were allowed to cool, and the ethyl cellulose produced was separated and washed free from alkali and salt. It was soluble in 80/20 benzene/ethanol and in benzene alone and had an ethoxyl content of 48.1%.

Example 6

100 parts of shredded wood pulp, 67 parts of caustic soda as a 40% solution, 53 parts of chloracetic acid and 10 parts of mono-methyl glycol were kneaded together in a Werner-Pfleiderer mixer, the chloracetic acid being added in four equal portions at hourly intervals. The temperature rose to about 45° C. and was kept at this value for 16 hours. Carboxymethyl cellulose was precipitated with alcohol from the resulting solution, and was washed with alcohol until free from alkali and dried.

Although in all the examples mono-methyl glycol (i. e. the mono-methyl ether of ethylene glycol) is used as the hydroxyl-containing liquid, it may be replaced by similar proportions of other partial lower alkyl ethers of glycol or glycerol.

While the invention has been described with particular reference to the production of ethyl, methyl and carboxymethyl cellulose, it is also of value in the production of other alkyl and substituted alkyl ethers of cellulose, e. g. of propyl and butyl ethers of cellulose using the corresponding alkyl chlorides, and of benzyl cellulose using benzyl chloride, and also of mixed ethers such for example as methyl hydroxy-ethyl cellulose, ethyl hydroxy-ethyl cellulose and methyl ethyl cellulose.

Having described our invention, what we desire to secure by Letters Patent is:

1. Process for the manufacture of cellulose ethers, which comprises subjecting cellulose to the action of an etherifying agent in the presence of a caustic alkali and of a liquid ether-alcohol in an amount of from 5 to 30% on the weight of cellulose.

2. Process for the manufacture of cellulose ethers, which comprises subjecting cellulose to the action of an etherifying agent in the presence of a caustic alkali and of a partial alkyl ether of a glycol in amount of from 5% to 30% of the weight of the cellulose.

3. Process for the manufacture of cellulose ethers, which comprises subjecting cellulose to the action of an etherifying agent in the presence of a caustic alkali and of a partial alkyl ether of glycerol in amount of from 5% to 30% of the weight of the cellulose.

4. Process for the manufacture of cellulose ethers, which comprises subjecting cellulose to the action of an etherifying agent in the presence of a caustic alkali and of 2-methoxy-ethanol in amount of from 5% to 30% of the weight of the cellulose.

5. Process for the manufacture of lower alkyl ethers of cellulose, which comprises subjecting cellulose to the action of an alkyl chloride containing 1 to 4 carbon atoms in the presence of a caustic alkali and of a partial alkyl ether of a glycol in amount of from 10% to 30% of the weight of the cellulose.

6. Process for the manufacture of lower alkyl ethers of cellulose, which comprises subjecting cellulose to the action of an alkyl chloride containing 1 to 4 carbon atoms in the presence of a caustic alkali and of a partial alkyl ether of glycerol in amount of from 10% to 30% of the weight of the cellulose.

7. Process for the manufacture of lower alkyl ethers of cellulose, which comprises subjecting cellulose to the action of an alkyl chloride containing 1 to 4 carbon atoms in the presence of a caustic alkali and of 2-methoxy-ethanol in amount of from 10% to 30% of the weight of the cellulose.

8. Process for the manufacture of carboxymethyl cellulose, which comprises subjecting cellulose to the action of monochloracetic acid in the presence of a caustic alkali and of a partial alkyl ether of a glycol in amount of from 10% to 30% of the weight of the cellulose.

9. Process for the manufacture of carboxymethyl cellulose, which comprises subjecting cellulose to the action of monochloracetic acid in the presence of a caustic alkali and of a partial alkyl ether of glycerol in amount of from 10% to 30% of the weight of the cellulose.

10. Process for the manufacture of carboxymethyl cellulose, which comprises subjecting cellulose to the action of monochloracetic acid in the presence of a caustic alkali and of 2-methoxy-ethanol in amount of from 10% to 30% of the weight of the cellulose.

11. Process for the manufacture of cellulose ethers, which comprises impregnating cellulose with a caustic soda solution of concentration at least 70%, and subjecting the alkali cellulose so obtained to the action of a lower alkyl chloride containing 1 to 4 carbon atoms in the presence of a partial alkyl ether of a glycol in amount of from 10% to 30% of the weight of the cellulose.

12. Process for the manufacture of cellulose ethers, which comprises impregnating cellulose with a caustic soda solution of concentration at least 70%, and subjecting the alkali cellulose so obtained to the action of a lower alkyl chloride containing 1 to 4 carbon atoms in the presence of a partial alkyl ether of glycerol in amount of from 10% to 30% of the weight of the cellulose.

13. Process for the manufacture of cellulose ethers, which comprises impregnating cellulose with a caustic soda solution of concentration at least 70%, and subjecting the alkali cellulose so obtained to the action of monochloracetic acid in the presence of a partial alkyl ether of a glycol in amount of from 10% to 30% of the weight of the cellulose.

14. Process for the manufacture of cellulose ethers, which comprises impregnating cellulose with a caustic soda solution of concentration at least 70%, and subjecting the alkali cellulose so obtained to the action of monochloracetic acid in the presence of a partial alkyl ether of glycerol in amount of from 10% to 30% of the weight of the cellulose.

MERLYN HERBERT WILCOX.
JOHN DOWNING.
JAMES GORDON NAPIER DREWITT.

REFERENCES CITED

The following references are of record in the file of this patent:

UNITED STATES PATENTS

| Number | Name | Date |
|---|---|---|
| 1,980,988 | Ellsworth | Nov. 20, 1934 |
| 2,138,757 | Collings et al. | Nov. 29, 1938 |